United States Patent
Mishra et al.

(10) Patent No.: US 11,454,216 B2
(45) Date of Patent: Sep. 27, 2022

(54) WIND TURBINE SYSTEM AND METHOD

(71) Applicants: Dishant Mishra, Uttar Pradesh (IN); Samarth Jain, Haryana (IN)

(72) Inventors: Dishant Mishra, Uttar Pradesh (IN); Samarth Jain, Haryana (IN); Gyan Arora, Gujarat (IN)

( * ) Notice: Subject to any disclaimer, the term of this patent is extended or adjusted under 35 U.S.C. 154(b) by 0 days.

(21) Appl. No.: 16/967,426

(22) PCT Filed: Feb. 5, 2019

(86) PCT No.: PCT/IN2019/050091
§ 371 (c)(1),
(2) Date: Aug. 5, 2020

(87) PCT Pub. No.: WO2019/150400
PCT Pub. Date: Aug. 8, 2019

(65) Prior Publication Data
US 2021/0215138 A1    Jul. 15, 2021

(30) Foreign Application Priority Data
Feb. 5, 2018    (IN) .............................. 201811004227

(51) Int. Cl.
*F03D 9/12*    (2016.01)
*F03D 1/06*    (2006.01)

(52) U.S. Cl.
CPC .............. *F03D 9/12* (2016.05); *F03D 1/0675* (2013.01); *F05B 2240/21* (2013.01)

(58) Field of Classification Search
CPC ....... F03D 9/12; F03D 1/0675; F05B 2240/21
(Continued)

(56) References Cited

U.S. PATENT DOCUMENTS

| | | | |
|---|---|---|---|
| 4,710,101 A * | 12/1987 | Jamieson | .............. F03D 7/0252 416/32 |
| 6,752,595 B2 * | 6/2004 | Murakami | ............ F03D 7/0228 416/87 |

(Continued)

FOREIGN PATENT DOCUMENTS

HU    WO 2004/011801 A1 *    2/2004    ............... F03D 9/02

*Primary Examiner* — Pedro J Cuevas
(74) *Attorney, Agent, or Firm* — Rumit Ranjit Kanakia (57) ABSTRACT

A turbine (100) for generating energy is provided herein. The turbine (100) includes a hub (102), and a plurality of blades (104A, 104B, and 104C) attached to the hub (102). The turbine (100) further includes a rotor plane having disposed thereon masses (114) that are configured to be moved in a radial direction by a driving mechanism. The turbine (100) further includes an energy storage means connected to the driving mechanism. During operation, the blades are configured to be rotatable by a moving wind, and the driving mechanism is configured to move the masses (114) radially inwards or outwards in the rotor plane. Further, when the masses (114) are moving radially out in the rotor plane, the energy storage means is configured to store the radial kinetic energy of the masses (114) in form of electrical energy, and the stored energy is utilized to provide required accelerating torque to the turbine, by means of bringing the disposed movable masses in the rotor plane radially inwards at desired rate, based on a turbine's control strategy.

13 Claims, 5 Drawing Sheets

(58) Field of Classification Search
USPC .......................... 290/44, 55; 416/1, 87, 145
See application file for complete search history.

(56) References Cited

U.S. PATENT DOCUMENTS

| | | | | |
|---|---|---|---|---|
| 6,902,370 | B2* | 6/2005 | Dawson | F03D 7/0236 415/4.1 |
| 7,071,578 | B1* | 7/2006 | Shibata | F03D 7/0236 290/55 |
| 7,245,042 | B1* | 7/2007 | Simnacher | H02K 7/1876 290/55 |
| 7,425,774 | B2* | 9/2008 | Shibata | F03D 7/0236 290/55 |
| 7,425,775 | B2* | 9/2008 | Shibata | F03D 7/0236 290/55 |
| 7,436,085 | B2* | 10/2008 | Shibata | F03D 7/0236 290/55 |
| 7,581,926 | B1* | 9/2009 | Dehlsen | F03D 7/0236 416/87 |
| 7,632,070 | B2* | 12/2009 | Dawson | F03D 7/0236 416/89 |
| 8,231,347 | B2* | 7/2012 | Dawson | F03D 1/0683 416/87 |
| 8,485,782 | B2* | 7/2013 | Turmanidze | F03D 7/0236 416/48 |
| 8,851,840 | B2* | 10/2014 | Hancock | F03D 1/0675 416/23 |
| 9,651,024 | B2* | 5/2017 | Soloway | F03D 1/0675 |
| 2003/0206802 | A1* | 11/2003 | Gmirya | B64C 27/473 416/87 |
| 2003/0223868 | A1* | 12/2003 | Dawson | F03D 7/0236 416/1 |
| 2003/0230898 | A1* | 12/2003 | Jamieson | F03D 7/0236 290/55 |
| 2005/0207889 | A1* | 9/2005 | Shibata | F03D 7/0236 416/132 B |
| 2005/0207890 | A1* | 9/2005 | Shibata | F03D 7/0236 416/132 B |
| 2009/0252608 | A1* | 10/2009 | Metivier | B64C 27/008 416/1 |
| 2009/0304507 | A1* | 12/2009 | Dehlsen | F03D 1/0675 416/87 |
| 2009/0317251 | A1* | 12/2009 | Tsou | F03D 80/80 416/51 |
| 2010/0150717 | A1* | 6/2010 | Turmanidze | F03D 1/0666 416/87 |
| 2010/0196159 | A1* | 8/2010 | Dawson | F03D 1/0683 416/87 |
| 2011/0217167 | A1* | 9/2011 | Hancock | F03D 1/0675 416/23 |
| 2012/0107116 | A1* | 5/2012 | Obrecht | F03D 7/0296 416/1 |
| 2013/0294913 | A1* | 11/2013 | Campbell | F01D 5/16 416/145 |
| 2015/0292478 | A1* | 10/2015 | Soloway | F03D 1/0675 416/145 |

* cited by examiner

WIND TURBINE SYSTEM AND METHOD

FIELD OF THE INVENTION

Embodiments of the present invention, generally relate to turbine, and in particular relate to that of the wind and tidal turbines such as horizontal and vertical axis turbines.

BACKGROUND

Burning of fossil fuels and climate change has encouraged generation of energy from renewable sources, such as sun and wind. Further, according to some estimates, conventional fossil resources, including oil, gas and coal, may diminish significantly in supplies by second half of this century. Due to these concerns, various technologies have been developed to harness energy from renewable sources.

There is high potential for harnessing energy from the wind, in addition to sun. Wind turbines convert kinetic energy of the wind to electrical energy. To harness wind, a wind turbine rotor blade with aerodynamic profile generate, under flowing wind, a rotary motion at the rotor shaft. This is used to drive generators, which in turn, can generate electricity.

Power output of a wind turbine is a function of cube of undisturbed wind velocity. One challenge to using wind as an energy source is that there is a significant variation in wind velocity over time and the power output is 'inconsistent' or 'less reliable' to appropriately match grid's demand.

Variation in wind velocity is detrimental to the health and lifespan of major mechanical components of wind turbine like tower, blades & gearbox due to increased frequency of cyclic loading.

Also, electrical generator due to its limitation can only admit a requisite amount of peak power at which the turbine is said to be rated. The undisturbed wind velocity corresponding to the rated power of the generator is known as rated velocity (Vrated) of turbine and the electrical power available at rated power (Prated) is the maximum power of generator. Wind power available beyond rated velocity is rejected by turbine to safeguard the generator. Inevitably, a significant amount of wind energy, available beyond rated, forego and remain unutilized in existing design.

Due to low penetration of wind supplies in current energy mix in power grid, effect of inconsistencies between power supply and demand are not very pronounced. Deficiencies in power supply arising due to such inconsistencies are currently met through balancing power from available operators. Alternatively, in power bidding market, wind operators bid conservatively to avoid penalties as per grid business codes. Consequently, capacity utilization ratio of wind operators remains low.

As, wind power penetration grows, large volume of wind supplies may not be maintained without increasing reliability and reducing availability-demand gap. Energy storage is an imperative solution to address this gap. Battery energy storage systems are the most prudent form of storage solutions currently available.

Electrical battery storage can be deployed once the power is available in electrical form in the downstream of electrical generator. Batteries can be a good solution for large scale storage at grid level. But in short term range where wind power may vary significantly or available beyond rated, a large volume of energy, in the upstream of generator has to be rejected, to safeguard electrical or mechanical limitations, electrical battery storage cannot be deployed. Chemical storage like hydrogen again requires electrical power, poses similar shortcomings. Conventional flywheel storage occupies large space.

These conventional arts do not provide a reliable and consistent solution to effectively store large volume of energy in short range while there is a significant gap between power available to power demand or while there are issues with power dispatchability. The conventional attempts have not been able to reduce the inefficiencies and difficulties inherent in using wind as a more reliable and consistent source for energy.

Notwithstanding these problems, as wind is a significant natural resource that will never run out, and is available in abundance in many geographies, there is a need to try to develop a short-term energy storage system that can increase throughput of the power available in wind to electrical power output, make turbine power output more consistent to grid's demand and to reduce critical loading on turbine's major component.

Further, tidal turbines also suffer from similar systematic problems as wind turbines. This is due to reason that fuel or fluid supply or input energy is controlled by nature, they cannot be controlled according to the output requirement. Such, there is a need of improved turbine that can solve above mentioned problems.

SUMMARY

According to an aspect of the present disclosure, a turbine (100) for generating energy is provided herein. The turbine (100) includes a hub (102) and a plurality of blades (104A, 104B, 104C). The blades (104) are attached from one end to the hub (102), and located equidistant from each other. The other end of the blade is tip (103). In an embodiment, the turbine (100) further includes a rotor plane having disposed thereon masses (114) that are configured to be moved in a radial direction by a driving mechanism. The turbine (100) further includes an energy storage means connected to the driving mechanism. During operation, the plurality of blades are configured to be rotatable by a moving wind, and the driving mechanism is configured to move the masses (114) radially inwards or outwards in the rotor plane. Further, when the masses (114) are moving radially out in the rotor plane, the energy storage means is configured to store the radial and tangential kinetic energy of the masses (114), and the stored energy is utilized to provide required accelerating torque to the turbine, by means of bringing the disposed movable masses (114) in the rotor plane radially inwards at desired rate, based on a turbine's control strategy.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

Figure 1:
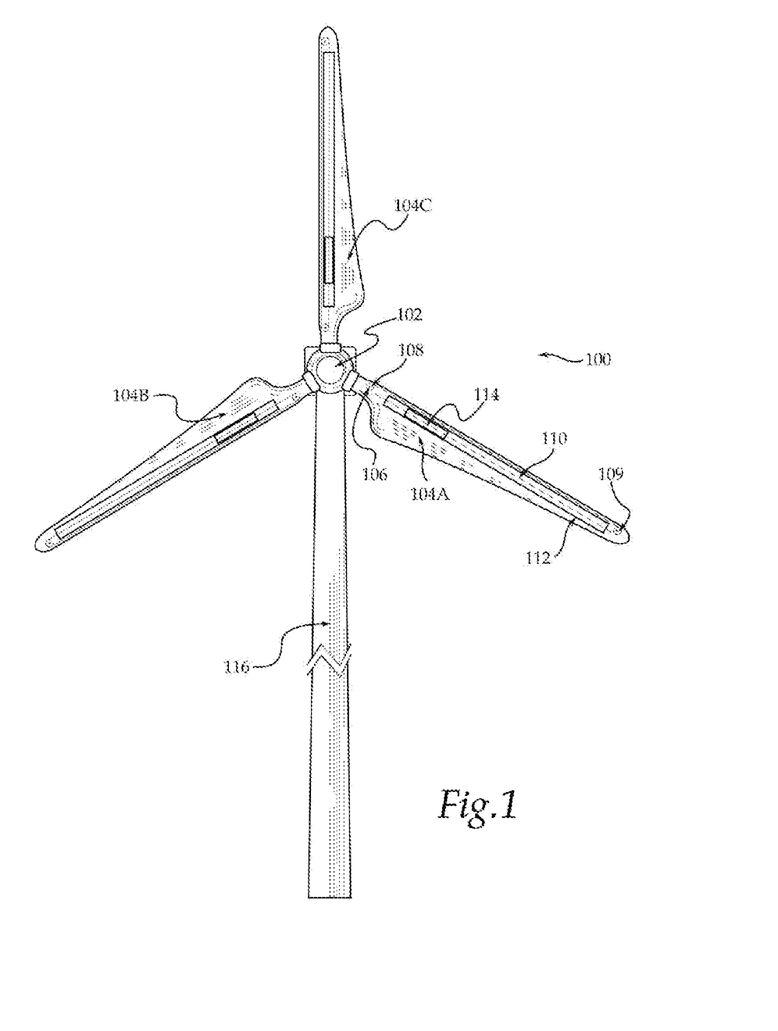
FIG. 1 illustrates a front view of blades of a turbine, according to an embodiment of the present invention.

FIG. 1 illustrates a front view of the turbine 100. In an embodiment of the present disclosure, the turbine 100 includes a hub 102 and a plurality of blades 104A, 104B, and 104C. The blade 104 include a proximal end and a distant end (also referred to as hub end and tip end respectively). In an embodiment, the proximal end of the blades 104 is attached with the hub 102. Further, the blades are located equidistant from each other. Further, the hub 102 is mounted over a tower 116. Further, according to an embodiment of the present invention, moving wind is configured to rotate the blades 104 of the wind turbine 100.

According to an embodiment of the present invention, the turbine 100 further includes a rotor plane having disposed thereon masses 114 that are configured to be moved in a radial direction by a driving mechanism. The turbine 100 further includes an energy storage means connected to the driving mechanism. In an embodiment, the plurality of blades are configured to be rotatable by a moving wind, and the driving mechanism is configured to move the masses 114 radially inwards or outwards in the rotor plane.

Figure 2:
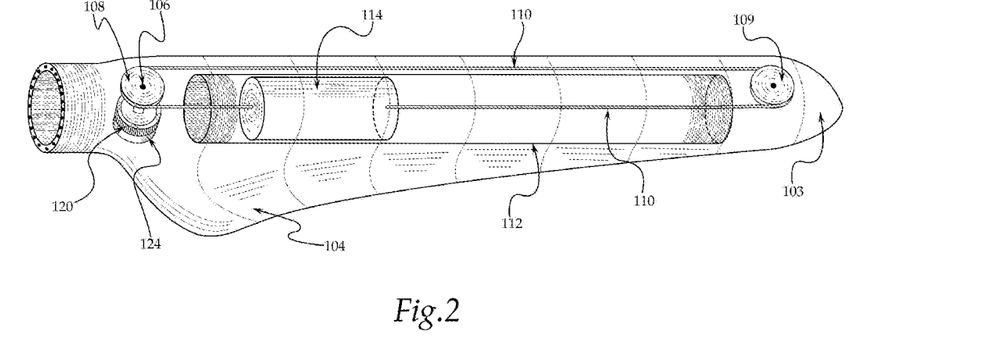
FIG. 2 illustrates an orthogonal view of the blade of the turbine, according to an embodiment of the present invention.

FIG. 2 illustrates orthogonal view of the turbine 100. Each of the blades 104 includes the driving mechanism (for example, a drive shaft 106). Each of the drive shaft 106 includes a first pulley 108 provided on the hub end or proximal end, a second pulley 109 at tip end or distant end, a guide string 110, and a mass-section 112, having movable mass 114. The mass-section 112 includes a free space running between hub end and tip end to allow motion of movable mass 114 in rotor plane.

In an embodiment, the guide string 110 is a drive element mounted over the first pulley 108 and second pulley 109. The guide string 110 and the first pulley 108 and second pulley 109 are configured to move the mass (or 'movable mass') 114 inside mass-section 112. Further, in an embodiment, the drive shaft 106 is connected with an energy storage means (for example, regenerative motor 120 and electrical energy storage system 124; and/or rotor in motion). The regenerative motor 120 is a motor which can supply torque to the pulley 108 by using electrical power in motor action, while it can utilize mechanical torque available at pulley 108 to generate electrical power in generator action. Regenerative motor 120 is connected to an electrical energy storage (or battery) system 124 to store or supply electrical energy.

Figure 3:
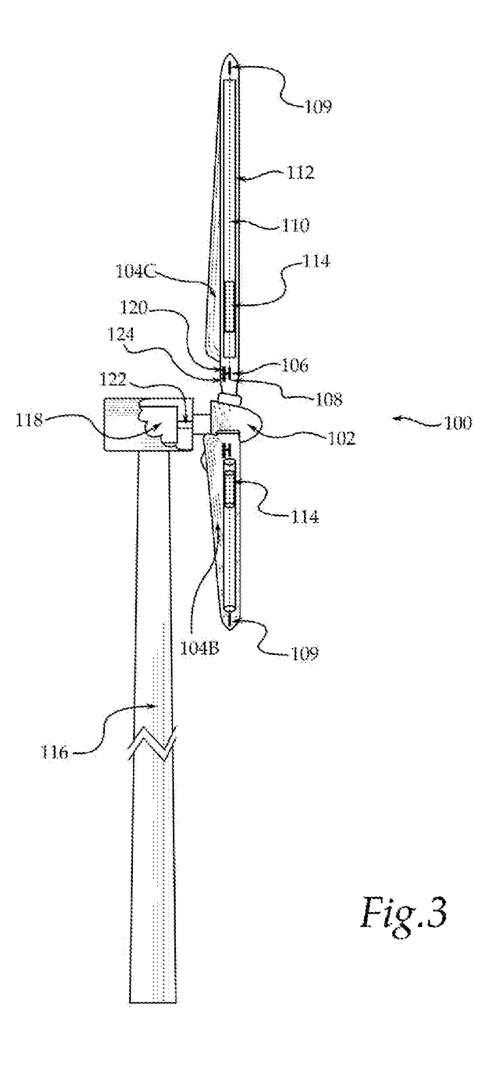
FIG. 3 illustrates a schematic diagram of a tower and blades of the turbine, according to an embodiment of the present invention.

As shown in side view of the turbine 100 in FIG. 3, the wind turbine 100 further includes a tower 116, on which an electric generator 118 is mounted. The generator 118 is coupled to the hub 102 through main shaft 122. In an embodiment, an integrated form of all the rotating members together during operations or otherwise may be termed as rotor assembly or rotor, while the rotor assembly of turbine rotates in the axis of rotation passing through center of hub of the turbine and perpendicular to the rotor plane.

Those skilled in art will appreciate, Rotor plane is the plane/s perpendicular to the axis of the main shaft 122 which, through bearings, supports the wind turbine rotor/rotor assembly, where the quarter chord lines intersect, or pass closest to, the rotor axis or plane/s parallel to it. Further Rotor plane can be a plane of any rotating body along the turbine that transfers the rotation from rotor to generator, before being converted into electrical energy by the main generator 118.

In an embodiment, the energy storage means (for example, regenerative motor 120 and electrical energy storage 124) may be connected to main generator 118 and may be further connected to power grid through a connection (such as slip-ring) to supply or consume power to or from main generator 118 or power grid.

Those skilled in the art will appreciate, that since the mass-section 112 carries movable mass 114, movement of the movable mass 114 can be radially inwards in the rotor plane toward the center of the hub 102 or radially outwards in rotor plane or away from the center of the hub 102 which would effectively change the position of mass with respect to the axis of rotation passing through the center of hub 102 and perpendicular to rotor plane and parallel to main shaft 122 (or by increasing or decreasing the quantity of mass). In an embodiment, movement of drive shaft 106 connected to regenerative motor 120 is configured to change moment of inertia of the system 100 at a desired rate in the axis of rotation passing through the center of hub 102 and parallel to main shaft 122.

In an embodiment, the masses 114 may be fluidic, magnetic, chemical, and mechanical type masses, and are configurable to be movable in the radial direction outwards and inwards in the rotor plane by the means of mechanical, electrical, magnetic, pneumatic, and hydraulic motive elements. In another embodiment, the masses 114 may be selected from a fluid or a flexible material, and the masses 114 are configured to take suitable shape according to its boundary conditions.

Figure 4:
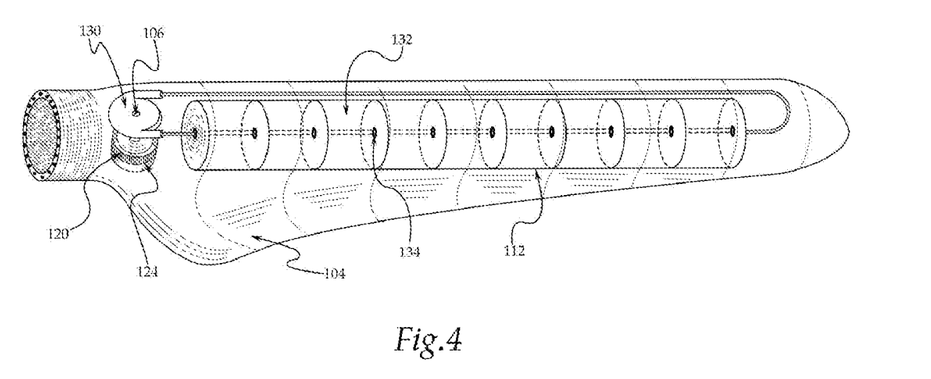
FIG. 4 illustrates a schematic diagram of fluid filling blade of the turbine, according to an embodiment of the present invention.

FIG. 4 illustrates a fluid filling-based turbine blade system 100, in accordance with an embodiment of the present invention. In an embodiment, a pump-cum-turbine 130 may actuate the quantity of fluid inside multiplicity of various chambers 132 constructed inside mass-section 112. Further, the pump-cum-turbine 130 is connected to a regenerative motor 120 and electrical energy storage 124. In an embodiment, the fluid flow may be controlled and locked through multiplicity of various control valves 134 provided in between chambers 132. Further, combination of chambers may be filled by fluid and locked so to increase or decrease the mass in chambers 132 such to change the position of mass with respect the center of the hub 102 to actuate the rate of change of moment of inertia.

According to an embodiment of the present disclosure, movable mass 114 or mass-section 112 may be made of flexible materials. In an embodiment, a flexible polymer mass-section 112 may be used that can take the shape of the blade such that changing shape enables movement of movable mass 114 to change the position of mass with respect to center of hub to actuate the rate of change of moment of inertia of turbine rotor assembly.

According to another embodiment of the present disclosure, a magnetic powder may also be used for mass section 112. The magnetic powder may be transported from one end of the blade to other end using electromagnets on blade hub and tip side. The mass-section bounded by metal strips may also be moved using magnetic levitation or maglev technology.

In an embodiment, the turbine 100 is configured to provide stability in power output as a single or multiple units, operating in an electrical power grid, to compensate the drop and rise in the grid frequency or during similar grid event or fault by acting as a positive and negative operating energy storage reserve. The turbine 100 may be configured to reduce the amplitude of various types cyclic and static structural loading on major components of the turbine, by the means of providing accelerating and decelerating torque on the turbine which smoothens out the angular deceleration and acceleration of the turbine whenever there is a sudden drop and/or rise in aerodynamic torque acting on the turbine.

Figure 5:
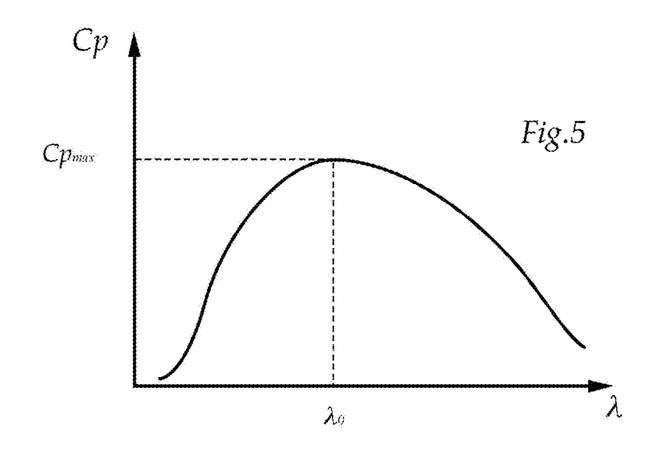
FIG. 5 illustrates relationship between power coefficient and tip speed ratio (Cp–λcurve) of the turbine, according to an embodiment of the present invention.

FIG. 5 illustrates the relationship between turbine power coefficient given by $C_p$ and its tip speed ratio given by $\lambda$. The power coefficient is the ratio of turbine mechanical (or electrical) power output to its power input in form of kinetic energy of wind. Tip speed ratio represents the ratio of velocities of 'tip of the turbine blade' $V_{tip}$ to 'undisturbed wind' $V_{inf}$. Those skilled in the art will appreciate that all major wind turbines follow such a relationship where it's maximum power coefficient given by $C_{pmax}$ is observed at an optimum value of tip speed ratio given by $\lambda_o$.

In an embodiment, while wind velocity goes above rated velocity of turbine, the amount of energy (in unit time) beyond rated may be termed as excess wind energy. Furthermore, any wind energy that is bound to cause undesired acceleration of wind turbine can be termed as excess wind energy. The excess wind energy loads the turbine with excess aerodynamic torque, which is loaded by aerodynamic members like blades 104 of the turbine to the main shaft 122. Excess aerodynamic torque available at main shaft 122 makes the turbine accelerate to further accelerate the electrical generator 118 to exceed its electrical limitations (rated power) which is undesired in conventional art, such excess aerodynamic energy is rejected through certain mechanical or electrical interventions like blade pitching or bringing turbine to non-optimum operations through generator magnetization control.

Figure 6:
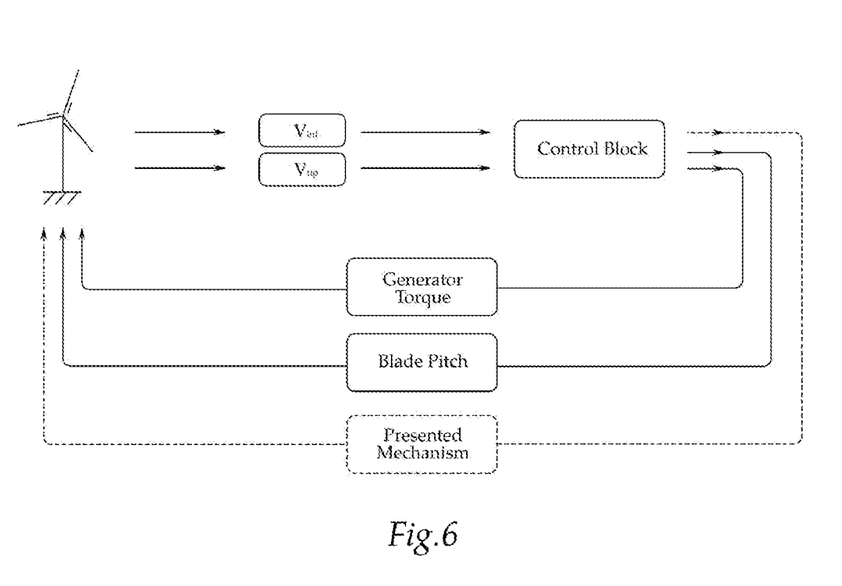
FIG. 6 illustrates a schematic diagram of control loops of the turbine, according to another embodiment of the present invention.

FIG. 6 illustrates the current control loops through 'generator magnetization' and 'blade pitching', while the 'presented mechanism' offers the same functionality as a control loop for various objective served by current control system of the turbine while significantly reducing the losses incurred while executing such control. Presented mechanism would be placed with a preference over existing control by the turbine control strategy.

In an embodiment, the turbine 100 is configured to convert excess wind energy into radial and tangential kinetic energy of movable mass 114 which ultimately gets stored, partially in the form of rotational kinetic energy of the movable mass 114 and partially supplied as electrical energy to electrical energy storage system 124 connected to regenerative motors 120. The stored energy is configured to provide a decelerating torque by moving the movable mass 114 radially outward in the rotor plane or away from hub 102 in accordance with the control strategies when desired by the turbine 100. Further, some of energy stored as electrical energy from electrical energy storage system 124 and rotational kinetic energy of the mass may be used to provide an accelerating torque to the rotor assembly, by moving the movable mass 114 radially inward in the rotor plane or towards hub 102 in accordance with the control strategies when desired by the turbine 100.

In an embodiment of the present invention, primary control equation in turbine control strategy is given below in equation (1).

$$I_{rotor}\alpha_{rotor} = \tau_{aero} - \tau_{gen} - \omega_{rotor}\frac{dI_{rotor}}{dt} \qquad \text{Eq. (1)}$$

In the above equation (1), '$I_{rotor}$' is moment of inertia of the turbine rotor on the axis of rotation passing through the center of hub and perpendicular to rotor plane '$\omega_{rotor}$' is the angular velocity of the rotor, while '$\alpha_{rotor}$' is the angular acceleration of turbine rotor, '$\tau_{aero}$' is the aerodynamic torque which is produced by the aerodynamic effect of wind flowing (source of energy) over the blades of rotor and '$\tau_{gen}$' is the torque required by rotor to generates the electrical output, that may be varied by regulating magnetization (or torque demand) of the generator, and thus it may be programmed to utilize the available aerodynamic torque until generator reaches its maximum current carrying capacity.

Further, in the above equation (1), net torque is represented by the right hand side of the equation, which is the difference of aerodynamic ($\tau_{aero}$) and generator ($\tau_{gen}$) torque while the balance ($\omega_{rotor}*dI_{rotor}/dt$) is termed as Inertial torque. Inertial torque here is defined as the balancing torque supplied or consumed to compensate according of rate of change of moment of inertia of turbine 100 due to change in position of movable mass 114.

According to an embodiment, whenever an excess aerodynamic torque is present, the movable mass 114 are configured to move radially outwards in the rotor plane or away from the hub 102 to provide a decelerating inertial torque (or positive inertial torque for equation 1) that matches the excess aerodynamic torque present and hence convert the excess wind energy into movable mass's 114 radial and tangential kinetic energy which ultimately gets stored partially in the form of rotational kinetic energy of the mass 114 and partially supplied as electrical energy to electrical storage system 124 attached to regenerative motors 120.

According to an embodiment of the present disclosure, in event of decrease of input energy to the turbine, when the turbine is seeking to decelerate, the system 100 is configured to supply accelerating torque by moving the movable mass 114 radially inwards or towards the hub 102 in the blade 104 or by decreasing the mass of the blade or a combination of both, in stipulated or desired time to modulate the acceleration of the rotor, such that blade tip reaches a velocity at which it is able to extract maximum wind energy at that undisturbed wind velocity.

Further, according to an embodiment, the turbine 100 provides an energy storage system 124 that stores the excess wind energy available, while turbine may reach rated power, partially in mechanical form of rotational kinetic energy of the mass 114 and rest as electrical energy in electrical energy storage system 124 attached to regenerative motors 120.

Some portion of energy from electrical energy storage system 124 is utilized to maintain optimum progression of tip speed ratio, according to control strategies to maximize energy output.

The term optimum progression of tip speed ratio refers to maintaining the tip speed to its optimum or near to optimum value for all different values of undisturbed wind velocity ($V_{inf}$) according to its Cp-Lambda curve or as desired by the control strategy.

In an embodiment, when the turbine 100 is operating in below rated conditions and tip speed ratio is greater than optimum tip speed ratio, according to the turbine's control strategy, the masses 114 are configured to be moved in the rotor plane radially outwards to provide decelerating torque to the turbine system, and to bring turbine system's tip velocity value near or equal to the value that corresponds to optimum tip speed ratio for such undisturbed velocity ($V_{inf}$) thereby lengthening the duration of maximum efficiency operations of the wind turbine.

In an embodiment, turbine control method for maximum energy gain, provided by the system 100, while tip speed ratio is greater than optimum tip speed ratio (or $\lambda > \lambda_o$), the movable mass 114 moves radially outwards in the rotor plane or away from the hub 102 with desired speed and acceleration so as to provide a decelerating torque to the rotor which makes the turbine reach tip speed ratio nearly equal to optimum tip speed ratio (or $\lambda \approx \lambda_o$) which that gives Cp most near to Cp_max, in the shortest time in order to maximize the length of maximum efficiency operations of the turbine 100. Once Cp value reaches to the maximum possible value, movable mass 114 is actuated to slow down and park at that position in mass-section 112.

In an embodiment, turbine control method for maximum gain, provided by the present invention, while tip speed ratio is less than optimum tip speed ratio (or $\lambda < \lambda_o$), movable masses 114 moves radially inwards in the rotor plane or towards from the hub 102 with desired speed and acceleration so as to provide an accelerating torque to the rotor which makes the turbine reach tip speed ratio nearly equal to optimum tip speed ratio or tip speed ratio according to the assigned control strategies (or $\lambda \approx \lambda_o$) (for that particular $V_{inf}$ or undisturbed wind velocity) which gives Cp most close to Cp_max in the shortest time in order to maximize the length of maximum efficiency operations of the wind turbine. Once Cp value reaches to the maximum possible value, movable mass 114 is actuated to slow down and park at that position in mass-section 112.

In an embodiment, aerodynamic torque is a positive torque representing the source of energy fed into the rotor and generator torque is a negative torque representing the consumer of energy, which in turns generates electrical power in the generator 118 while inertial torque is positive or negative torque (or balancing torque) that presented mechanism provides. When excess aerodynamic torque is present, the mass 114 is configured to move forward to provide a decelerating torque (by moving the mass in accordance with the governing equation 1 given in this paper) that matches the excess aerodynamic torque available and hence balance the system to a net zero torque. Hence, the wind energy may be converted into movable mass's radial and tangential kinetic energy which is stored partially in the form of rotational kinetic energy of the movable mass 114 and partially supplied as electrical energy to electrical storage system 124 attached to regenerative motors 120.

In an embodiment, energy storage as a whole is termed as energy storage system of the turbine 100. Energy storage system can be broken down into rotational kinetic energy storage which is form of rotational energy of rotor assembly and radial kinetic energy storage which is in form of electrical energy storage system 124.

Further, the energy storage system of the turbine 100 is used to provide a balancing (accelerating or decelerating) torque by using some of stored energy from electrical energy storage system 124 attached with regenerative motors 120 and from tangential kinetic energy of the mass when turbine is operating below rated power to maintain optimum progression of tip speed ratio according to the mathematical relationship mentioned in equation 1.

The speed and acceleration of the movable mass 114 may be governed according to the control equation (1) so that the accelerating or decelerating torque is provided according to the needs of the turbine generator 118. In an embodiment, the above equation (1) may be valid in case where desired angular velocity of turbine in not changing. Further, equation (2) given below is valid if desired angular velocity is changing.

$$\frac{d(I_{rotor} \times \omega_{rotor})}{dt} = \tau_{aero} - \tau_{gen} \qquad \text{Eq. (2)}$$

In the above equation (2), net torque is represented by the right hand side of the equation, which is the difference of aerodynamic and generator torque. In an embodiment, aerodynamic torque is the source of energy fed into the rotor, and generator torque is the consumer of energy which in turn generates electricity in the generator and thus the turbine 100 provides an energy storage system that stores the excess wind energy when turbine is at its rated power partially in the form of rotational kinetic energy of the mass and rest supplied as electrical energy to electrical energy storage system 124 attached to regenerative motors 120.

In an embodiment, when generator electrical output fall below rated and movable mass 114 are parked at tip end of the rotor blade, the turbine is allowed to decelerate till it reaches an angular speed that corresponds to $\lambda_o$ at that particular $V_{inf}$. Once turbine is operating at $\lambda_o$, the torque demand (or magnetization) of the generator is increased by a value that is compensated by rate of change of moment of inertia at the current angular speed, caused due to maximum possible radially inwards movement of the movable mass 114, in that time step ($\omega_{rotor}*dI_{rotor}/dt$: accelerating torque provided by the presented mechanism to the turbine, by using some of energy stored as electrical energy from electrical storage system 124 attached to regenerative motors 120 and rotational kinetic energy of the mass) so that the increase in generator torque demand does not affect the angular speed ($\omega_{rotor}$) of the turbine.

In this way, the turbine 100 is able to extract the maximum possible energy from the wind, at that particular undisturbed velocity ($V_{inf}$) as well as by converting the excess rotational kinetic energy of the movable mass 114 and stored energy as electrical energy in electrical storage system 124 attached to regenerative motors 120, due to radially inwards movement of movable mass 114, feeds it back to the main turbine generator to increase the energy output by main generator 118 and maximize energy efficiency of turbine.

Further, in an embodiment, for noise restricted operations of turbine, tip velocity ($V_{tip}$) is not allowed to exceed a specific velocity known as noise restricted tip velocity ($V_{tip-noise}$). Further, if tip velocity is higher than noise restricted tip velocity of movable mass 114 may be utilized to decelerate the turbine to keep the tip velocity under or equal to noise restricted tip velocity.

Further in an embodiment, as the aerodynamic torque fall, turbine's speed falls below its rated angular velocity, and there is a net deceleration in the turbine 100. To maintain the rated power of the turbine, movable mass 114 are moved radially inward or towards the hub side with desired speed and acceleration i.e. to provide accelerating torque to the system, by using some of stored energy in form of electrical energy from electrical energy storage system 124 attached to regenerative motors 120 and rotational kinetic energy of the movable mass, to compensate for the net negative torque on the turbine ($\tau_{aero} - \tau_{gen}$).

In another embodiment, while undisturbed wind velocity ($V_{inf}$) is less than rated velocity ($V_{rated}$) and movable masses 114 are not parked on the hub side of the blade, movable masses 114 may be moved to achieve its optimum tip speed or rated tip speed quickly by moving towards the hub side with desired speed and acceleration by providing the desired accelerating torque to the rotor by using some of stored energy as electrical energy from electrical storage system 124 attached to regenerative motors 120 and rotational kinetic energy of the movable mass 114 for moving the movable mass 114 towards the hub end of the blade, so as to accelerate the turbine and make it reach optimum tip velocity ($V_{tip}$) quicker than the conventional turbine thereby lengthening period of best efficiency operations.

In another embodiment, if undisturbed velocity ($V_{inf}$) fluctuates around rated or where the time intervals in which undisturbed velocity ($V_{inf}$) is above rated are smaller, then movable mass 114 will move from hub end to tip end. The movable mass 114 is configured to maintain electrical power around rated power by oscillating on the tip side of the blade moving forth and back radially, with desired speed and acceleration so that the movable mass 114 is able to store and dispatch maximum energy when the intervals in which undisturbed velocity ($V_{inf}$) is above rated are small and hence produce maximum gain in electrical power on main generator 118 of the turbine.

In another embodiment, with availability of wind pre-sensing local instrumentation (such as light imaging, detection and ranging or LiDAR) is deployed onto the turbine, where such instrumentation is capable of measuring undisturbed velocity ($V_{inf}$) a few seconds in advance. The turbine controller may be fed with data of upcoming wind velocity series to foreplan the position, speed and acceleration of movable mass 114 and engage regenerative motor 120 in order to maintain inertial torque required to keep wind turbine running at maximum efficiency operations and to accordingly make the movable mass 114 in all blades reach the desired position mass-section 112 in desired time.

Further, in an embodiment, the regenerative motor 120 is a variable drive motor cum generator, which is attached to the drive shaft 106 connected to pulley 108 controlling the position of movable mass 114. Further, while the movable mass 114 are being moved out, the regenerative motor 120 is configured to act as a generator in regenerative braking mode and to generate power which can be dispatched to the electrical energy storage system 124 comprising of electrical batteries or a capacitor system or to the grid. In an embodiment, this power may be used subsequently (either from such a battery or capacitor or grid) to move the movable mass 114 toward hub in motor action according to the needs of the system 100.

Further, those skilled in art will appreciate that any system that uses regenerative or DC rotary/linear motors controlled to move the movable mass 114 may use regenerative braking. The system 100 may also use regenerative braking when the movable mass 114 have to be moved out in a controlled way.

In an embodiment, the equation for power consumed by regenerative motor 120 when movable mass 114 are moving radially outwards in rotor plane and power generated by regenerative motor 120, when movable mass 114 is moving radially inwards and outwards in rotor plane is given by following equations (3) and (4) respectively.

$$P_{inward} = \left( \frac{mV^2}{R_{mass\_pos}} - ma \right) * R_{pulley} * \omega_{pulley} * \eta_{regenerator} \qquad \text{Eq. (3)}$$

$$P_{outward} = \left( \frac{mV^2}{R_{mass\_pos}} + ma \right) * R_{pulley} * \omega_{pulley} * \frac{1}{\eta_{regenerator}} \qquad \text{Eq. (4)}$$

In the above equation (3) and (4), 'm' is mass of movable mass 114, 'V' is tangential velocity of center of mass of movable mass 114, '$R_{mass\_pos}$' is distance between the center of mass of movable mass 114 and center of hub 102 in the blade 104, 'a' is desired acceleration of the movable mass 114, '$R_{pulley}$' is radius of pulley 108 of regenerative motor 120, '$\omega_{pulley}$' is angular velocity of pulley 108 or of regenerative motor shaft, and '$\eta$' regenerator efficiency of the regenerative or motor.

Further, in an embodiment, during rapidly changing aerodynamic loads or in case of gusts and lulls, the turbine 100 is configured to enable the turbine to maintain almost constant power, prevent sudden changes in power production due to sudden decrease in turbine's angular velocity ($\omega_{rotor}$), by using the stored energy from electrical energy storage system 124 attached with regenerative motors 120 and rotational kinetic energy of the movable masses 114 to move the mass towards the hub end of the blade and provide accelerating torque (according to equation (1)) to compensate the sudden dip in aerodynamic torque when undisturbed ($V_{inf}$) suddenly decreases and by moving the movable mass 114 towards the tip end of the blade to provide a decelerating torque to compensate the sudden rise in aerodynamic torque, that matches the excess aerodynamic torque (here excess aerodynamic torque refers to the torque that would provide a sudden undesired increase in angular velocity of the turbine), when there is a sudden increase in aerodynamic torque, (according to equation (1)). Hence, converting the undesired kinetic energy of wind into movable mass's 114 radial and tangential kinetic energy and rest supplied to as electrical energy to electrical energy storage system attached to regenerative motors (according to equation (1)).

Further, in an embodiment, the turbine 100 is configured to serve as a primary or secondary grid control over blade pitch control of the conventional art (which rejects energy in order to safeguard electrical generator by maintaining power under its electrical limitation) when short term increase or decrease in power production is required as it stores additional energy in electrical energy storage systems 124 attached to regenerative motor 120 while movable mass 114 moves radially out in rotor plane to decrease power output of the turbine (or of wind farm as a whole when movable masses 114 are engaged at wind farm level when grid's power demand decreases) while at the same time it maintains max efficiency operations of a turbine during such events (where grid's power demands decreases) and this stored energy can be later utilized to supply grid's demand when desired by the turbine 100 (or when it suddenly increases) and this short term increase or decrease in power may be achieved by providing accelerating or decelerating torque to the turbine 100 respectively by the means of presented mechanism. The turbine 100 is also configured to maintain maximum efficiency operations of the turbine for more time when events in which primary or secondary grid controls are needed to regulate power output, according to grid's demands, of a turbine or windfarm or grid as whole occur.

Furthermore, the turbine 100 is configured to increase load bearing capacity of the blades in both edgewise and flap-wise direction according to Engineers bending theory mentioned below equation (5). Hence, according to the Engineer's bending theory, providing the blades with the presented mechanism, a larger bending moment due to aerodynamic forces on blades, as compared to conventional turbine, would be needed to cause fracture in blade material in both edge wise and flap wise direction. Furthermore, the turbine 100 may increase the second moment of area and hence the same bending moment due to aerodynamic forces on blades will lead to reduced amplitude of mean and cyclic stress in blade material in both edgewise and flapwise direction. Thereby, increasing the number of fatigue cycles blades can withstand without failing and hence increasing the life cycle of turbine blades.

$$= \frac{My}{Izz} \quad \text{Eq. (5)}$$

In the above equation (5) ' ' is bending stress, 'M' is bending moment on blades due to aerodynamic forces, 'y' is maximum distance from blade cross-section neutral axis to the surface of the blade, and '$I_{zz}$' is second moment of Area for blade cross-section.

Further, in an embodiment, by moving the movable masses 114 towards the tip end of the blade to provide a decelerating torque that matches the excess aerodynamic torque (here excess aerodynamic torque refers to the torque that would provide a sudden undesired increase in angular velocity of the turbine), when there is a sudden rise in aerodynamic torque (according to equation (1)) hence, converting the undesired kinetic energy in wind into movable mass's 114 radial and tangential energy which ultimately gets stored partially in the form of rotational kinetic energy of the mass and rest supplied to electrical energy storage system 124 such as batteries or capacitor attached to regenerative motors 120. Those skilled in the art will appreciate that due to curtailed acceleration, it would reduce amplitude of cyclic fatigue loads and additionally prevent resonance frequency conditions in various modes of major components of turbine such as blades, tower, and gearbox.

In another embodiment, the decrease in amplitude of cyclic fatigue loads will be able to improve the factor of safety and hence reduce the material cost of the turbine while it increase the life cycle of the turbine, if the material inputs in the turbine are not changed, as shown by Sodenberg's and Goodman's equation (6) given below.

$$N = \frac{S_u}{S_{avg} + S_r K_f \frac{S_u}{S_e}} \quad \text{Eq. (6)}$$

In the above equation (6), 'N' is number of stress reversals, '$S_u$' is ultimate tensile stress, '$S_{avg}$' is average stress on the system, '$S_r$' is cyclic stress on the system, '$K_f$' is stress concentration, and '$S_e$' is stress at which the system can last infinite no. of cycles. Due to curtailed acceleration the value of average stress ($S_{avg}$) on the system would be reduced to result in higher value of number of stress reversal (N) cycles.

The turbine 100 is further configured to prevent over speeding of the turbine and damage caused to turbine components due to it, in event of a grid failure or grid power demands reduce significantly, by consuming the excess wind energy. The above can be done by moving the movable mass 114 towards the tip end of the blade to provide a decelerating torque that matches the excess aerodynamic torque (here excess aerodynamic torque refers to the torque that would provide a sudden undesired increase in angular velocity of the turbine), when there is a sudden rise in aerodynamic torque, (according to equation (1)) hence, converting the undesired kinetic energy of wind into movable mass's radial and tangential kinetic energy which ultimately gets stored partially in the form of rotational kinetic energy of the mass and rest supplied to electrical energy storage system attached to regenerative motors 120 (according to equation (1)).

Further, according to an embodiment of the present invention, moving the movable mass 114 radially outward or inward in the rotor plane is configured to increase or decrease moment of inertia of the blade 104, as given by following equations:

$$I_b = m_b L^2/3 + m_b w^2/12$$

$$I_t = m_t l^2/3$$

$$I_h = m_h r^2/12$$

In the above equations, '$m_b$' is mass of each blade 104 without movable mass 114, '$m_t$' is mass of each movable mass 114, '$m_h$' is mass of hub 102 along with main shaft 122 and other rotating fitting, '$I_b$' is defined as the moment of inertia of each blade 104 without movable mass, '$I_t$' is defined moment of inertia of each movable movable mass 114, '$I_h$' is moment of inertia of hub 102 with main shaft 122 and other rotating fitting, 'L' is length of blade, 'w' is average width of blade, and 'r' is radius of hub 102, 'l' is distance between center of mass of movable mass 114 to the center of the hub 102 while masses 114 are parked nearest to the hub.

Assuming the turbine with three blades, resultant moment of inertia may be given by, $$I_{turbine} = (3 \times I_{blade}) + I_{hub} + (3 \times I_{movable-mass})$$

While $I_{blade}$ and $I_{hub}$ are constant value, $(3 \times I_{blade}) + I_{hub}$ is denoted as $I_{hub+blades}$, Moment of inertia of turbine while movable masses 114 are parked near hub is represented by $I_1$ which is given by:

$$I_1 = I_{hub} + I_{blades} + 3 \times (m_t l^2/3) = I_{hub+blades} + m_t l^2$$

In an embodiment, moment of inertia of turbine while movable masses 114 are parked nearest to the tip end represented by $I_2$, while the displacement of movable mass 114 travel between hub end and tip end is given by $\Delta l$.

$$I_2 = I_{hub} + I_{blades} + m_t (l + \Delta l)^2$$

Change in moment of inertia in the above two positions is given by:

$$\Delta I = I_2 - I_1 = (I_{hub+blades} + mt(l + \Delta l)^2) - (I_{hub+blades} + m_t l^2)$$

$$\Delta I = m_t (\Delta l^2 + 2l \cdot \Delta l) \quad \text{Eq. (7)}$$

In an embodiment, equation (7) shows how moving the movable mass 114 radially outwards in rotor plane (increasing Δl) and radially inwards in rotor plane (decreasing Δl) increases and decreases respectively the moment of inertia ($I_{rotor}$) of the turbine, this increase or decrease in moment of inertia in a given time gives differential moment of inertia represented by dI/dt and its product with rotor angular velocity ($\omega_{rotor}$) gives the inertial torque which can be added or removed to and from system respectively.

Further in an embodiment of the present invention, according to equation (7), another way of increasing moment of inertia of the system can be achieved through increasing or decreasing the mass in mass-section 112 with some material as illustrated in FIG. 4. Those skilled in the art will appreciate that it will also increase or decrease the moment of inertia of turbine and this increase or decrease in inertia in a stipulated time duration gives differential moment of inertia (dI/dt) and its product with rotor angular velocity ($\omega_{rotor}$) gives the accelerating or decelerating torque which can be provided to the turbine 100. In an embodiment, a combination of moving the mass and increasing the mass can also be used to increase the inertia of the system 100.

Further, in another embodiment, when the need is to provide accelerating torque to the turbine to achieve the gains mentioned above, the movable mass 114 may be emptied/decreased first and then moved radially inwards in the rotor plane as the electrical energy consumed by regenerative motor 120 to move the mass-sections back may be reduced significantly according to the energy balance equation mentioned in this paper.

Further, according to an embodiment of the present invention, a method is provided for increasing efficiency of turbine 100. The method may include steps of rotating a plurality of blades (104A, 104B, and 104C) of the turbine by a moving wind, moving the masses 114 disposed in rotor plane in a radial direction inwards or outwards by a driving mechanism, storing the radial kinetic energy of the masses 114 in form of electrical energy when the masses 114 are moving radially out in the rotor plane, and utilizing the stored energy to provide required accelerating torque to the turbine, by means of bringing the disposed movable masses in the rotor plane radially inwards at desired rate, based on a turbine's control strategy, thereby lengthening the duration of maximum efficiency operations of the wind turbine.

The wind and tidal turbine 100 advantageously provides an energy storage system that can be utilized while turbine's electrical power output is at its rated power and/or excess wind energy is present. At that time instead of changing the blade pitch that discards the excess aerodynamic torque available to turbine, to overcome the positive difference of aerodynamic torque and generator torque represented by ($\tau_{aero}-\tau_{gen}$), movable masses 114 placed inside the blades are moved towards tip to converts the excess aerodynamic torque ($\tau_{aero}$) into the movable mass's 114 radial and tangential kinetic energy.

Further, turbine 100 is configured to advantageously store the excess wind energy available while turbine is at its rated power, partially in the form of rotational kinetic energy of the movable masses 114 and rest as electrical energy in electrical energy storage system 124 attached to regenerative motors 120. A part of this aforementioned stored energy is utilized in maintaining optimum progression of tip speed, according to control strategies and turbine governing equation mentioned in this paper, when turbine falls below rated power, thus generating more electrical energy output from the turbine generator 118 compared to conventional turbine generator.

Further, the turbine 100 advantageously provides generator power output stability benefits. In an embodiment, the turbine 100 is able to store energy and actuate the torque and thereby acceleration of the rotor assembly and thereby able to provide better feed of generator torque to the generator 118, enabling the generator 118 to match precisely the quantitative and qualitative parameters of the electrical power in demand by the power grid. Further, the turbine 100 provides opportunity for the power grid to utilize the energy storage system as positive or negative operating reserves.

Further, the wind and tidal turbine 100 advantageously stores excess wind energy into movable mass's 114 radial and tangential kinetic energy which ultimately gets stored partially in the form of rotational kinetic energy of the movable masses 114 and rest as electrical energy in electrical energy storage system 124 attached to regenerative motors 120, by actuating the rate of change of moment of inertia of the turbine by moving the movable mass 114 radially inward or outward in rotor plane controlled through primary control equation (1) and/or equation (2) as desired by turbine's control strategy.

Further, the turbine 100 has another advantage, moving the movable mass 114 towards the tip end of the blade to provide a decelerating torque that matches the excess aerodynamic torque while there is a sudden rise in aerodynamic torque, converting the undesired kinetic energy in wind into movable mass's 114 radial and tangential energy which ultimately gets stored partially in the form of rotational kinetic energy of the movable mass 114 and rest supplied to electrical energy storage system 124 such as batteries or capacitor attached to regenerative motors 120 can curtail acceleration to reduce amplitude of cyclic fatigue loads and additionally prevent resonance frequency conditions and pronounced vibrations in various modes of major components of turbine such as blades, tower and gearbox. The reduction in amplitude of cyclic fatigue loads will be able to improve the factor of safety and hence reduce the material cost of the turbine while it increases the life cycle of the turbine, if the material inputs in the turbine are not changed.

Further, the turbine 100 provides another advantage that at Vinf where turbine's electrical power output is below its rated power, when the turbine is seeking to accelerate, provide an accelerating torque by using a fraction of energy stored as electrical energy from energy storage system 124 attached to regenerative motors 120 and rotational kinetic energy of the movable mass 114 by moving the movable mass 114 towards the hub end of the blade in desired time to increase its acceleration and make it reach blade tip velocity at which it is able to extract maximum energy, quicker than a conventional turbine thus increasing the duration of max efficiency operations of the turbine. Further, the turbine 100 is applicable to all turbines where fuel supply or input energy is controlled by nature/uncontrolled/cannot be controlled according to the requirements. Further, the presented mechanism of the turbine 100 can act as electromechanical energy storage system.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A turbine (100) for generating energy, the turbine (100) comprising:
   a hub (102);
   a plurality of blades (104A, 104B, and 104C) attached to the hub (102);
   a rotor plane having disposed thereon masses (114) that are configured to be moved in a radial direction by a driving mechanism;
   an energy storage means connected to the driving mechanism;
   wherein the driving mechanism is a plurality of drive shafts (106A, 106B, 106C) that are attached to the plurality of blades (104A, 104B, and 104C); and
   wherein each of the drive shaft (106A, 106B, 106C) comprises a first pulley (108), a second pulley (109), and a guide string (110), wherein the guide string (110) is mounted over the first pulley (108) and the second pulley (109).

2. The turbine (100) of claim 1, wherein the driving mechanism is configured to move the masses (114) radially inwards or outwards in the rotor plane.

3. The turbine (100) of claim 1, wherein the guide string (110), the first pulley (108), and the second pulley (109) are configured to move the masses (114) in a radial direction, inwards or outwards, in the rotor plane.

4. The turbine (100) of claim 1, wherein the energy storage means that stores movable mass's (114) radial kinetic energy and tangential kinetic energy while the masses (114) are moving radially outwards in the rotor plane and utilizes the stored energy to move the masses (114) radially inward in the rotor plane to further supply energy to rotor for increasing the energy efficiency and power output stability of turbine (100).

5. The turbine (100) of claim 1, wherein the masses (114) are configured to be movable in the radial direction outwards and inwards in the rotor plane by the means of mechanical, electrical, magnetic, pneumatic, and hydraulic motive elements or combination of the such motive elements.

6. The turbine (100) of claim 1, wherein the masses (114) are selected from a fluid or a flexible material and the masses are configured to take suitable shape according to its boundary conditions.

7. The system according to claim 1, wherein the masses (114) material may be a high density material.

8. The turbine (100) of claim 1, wherein movement of the masses (114) in a radially inwards or outwards direction in the rotor plane is configured to actuate net torque on the rotor of turbine (100), by actuating the rate of change of moment of inertia of the turbine system, as desired.

9. The turbine (100) of claim 1, wherein the energy storage means comprise of a regenerative motor (120) and an electrical energy storage system (124).

10. The turbine (100) of claim 1, wherein the energy storage means is selected from a group of electrical, mechanical, pneumatic, hydraulic or chemical means or combination of the such means.

11. The turbine (100) of claim 1, further comprising a generator (118) that is mounted over a tower (116), and the generator (118) is connected to the energy storage means.

12. The system according to claim 1, characterized by that when there is excess wind energy present at turbine (100) and thus excess aerodynamic torque at rotor, according to a turbine's control strategy, disposed movable masses in the rotor plane are moved radially outwards at a desired rate so as to provide a decelerating torque to balance excess aerodynamic torque and converts this excess wind energy into movable masses (114) radial and tangential kinetic energy to be further stored through the energy storage means wherein according to the turbine's control strategy, the stored energy is utilized to provide the required accelerating torque to the turbine, while the disposed movable masses in the rotor plane are moved radially inwards at desired rate.

13. The turbine (100) of claim 1, wherein when the turbine is operating in below rated power conditions and tip speed ratio is less than optimum tip speed ratio, according to a turbine's control strategy, the masses (114) are configured to be moved in the rotor plane radially inwards to provide accelerating torque and to bring turbine's tip velocity near or equal to the value that corresponds to optimum tip speed ratio for such undisturbed velocity ($V_{inf}$) thereby lengthening the duration of maximum efficiency operations of the wind turbine.

* * * * *